(12) United States Patent
Kitazawa et al.

(10) Patent No.: US 10,202,529 B2
(45) Date of Patent: *Feb. 12, 2019

(54) SILICONE COMPOSITION AND METHOD FOR MANUFACTURING HEAT-CONDUCTIVE SILICONE COMPOSITION

(71) Applicant: SHIN-ETSU CHEMICAL CO., LTD., Tokyo (JP)

(72) Inventors: Keita Kitazawa, Annaka (JP); Kunihiro Yamada, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,689

(22) Filed: Nov. 22, 2017

(65) Prior Publication Data

US 2018/0086960 A1    Mar. 29, 2018

Related U.S. Application Data

(63) Continuation of application No. 14/914,100, filed as application No. PCT/JP2014/003157 on Jun. 13, 2014, now Pat. No. 9,969,919.

(30) Foreign Application Priority Data

Sep. 20, 2013 (JP) ................. 2013-194880

(51) Int. Cl.
| | |
|---|---|
| *C08K 3/08* | (2006.01) |
| *C09K 5/08* | (2006.01) |
| *C08K 3/22* | (2006.01) |
| *C08L 83/04* | (2006.01) |
| *C08L 83/14* | (2006.01) |
| *C09K 5/14* | (2006.01) |
| *C08G 77/08* | (2006.01) |
| *C08G 77/12* | (2006.01) |
| *C08G 77/20* | (2006.01) |

(52) U.S. Cl.
CPC ............... *C09K 5/08* (2013.01); *C08G 77/08* (2013.01); *C08K 3/08* (2013.01); *C08K 3/22* (2013.01); *C08L 83/04* (2013.01); *C08L 83/14* (2013.01); *C09K 5/14* (2013.01); *C08G 77/12* (2013.01); *C08G 77/20* (2013.01); *C08K 2003/0812* (2013.01); *C08K 2003/2296* (2013.01)

(58) Field of Classification Search
CPC ............. C08K 3/08; C08K 3/22; C08L 83/04
See application file for complete search history.

(56) References Cited

U.S. PATENT DOCUMENTS

| | | | |
|---|---|---|---|
| 6,306,957 B1 | 10/2001 | Nakano et al. | |
| 2002/0014692 A1 | 2/2002 | Yamada et al. | |
| 2003/0049466 A1 | 3/2003 | Yamada et al. | |
| 2003/0127496 A1 | 7/2003 | Tetsuka et al. | |
| 2005/0110133 A1 | 5/2005 | Yamada et al. | |
| 2007/0149834 A1 | 6/2007 | Endo et al. | |
| 2011/0163460 A1 | 7/2011 | Kato et al. | |
| 2012/0119137 A1* | 5/2012 | Tsuji ............... | C09K 5/14 252/78.3 |
| 2012/0161066 A1 | 6/2012 | Hirabayashi et al. | |

FOREIGN PATENT DOCUMENTS

| | | |
|---|---|---|
| CN | 1626598 A | 6/2005 |
| CN | 102533214 A | 7/2012 |
| CN | 102604386 A | 7/2012 |
| EP | 0939115 A1 | 9/1999 |
| JP | 2938428 B1 | 8/1999 |
| JP | 2938429 B1 | 8/1999 |
| JP | 3580366 B2 | 10/2004 |
| JP | 2005154532 A | 6/2005 |
| JP | 3952184 B2 | 8/2007 |
| JP | 2009292928 A | 12/2009 |
| JP | 2010-059237 A | 3/2010 |
| JP | 4572243 B2 | 11/2010 |
| JP | 4656340 B2 | 3/2011 |
| JP | 2011-088953 A | 5/2011 |

(Continued)

OTHER PUBLICATIONS

Jul. 20, 2017 Office Action cited in Chinese Patent Application No. 2014-800299045 with partial translation.
Mar. 22, 2016 International Preliminary Report on Patentability issued in International Patent Application No. PCT/JP2014/003157.
Mar. 8, 2016 Office Action issued in Japanese Patent Application No. 2013-194880.
Jan. 23, 2017 Office Action issued in Chinese Application No. 2014800299045.
May 17, 2017 Office Action issued in Taiwanese Patent Application No. 103116724.
Aug. 22, 2017 Office Action Issued in U.S. Appl. No. 14/914,100.
Aug. 7, 2017 Office Action issued in U.S. Appl. No. 14/786,676.
Jun. 28, 2017 Office Action issued in Chinese Patent Application No. 201480051764.1.
Jul. 20, 2017 Office Action issued in Chinese Patent Application No. 2014-800299045, with partial translation.

(Continued)

*Primary Examiner* — Margaret G Moore
(74) *Attorney, Agent, or Firm* — Oliff PLC; Aaron L. Webb; Joel S. Armstrong

(57) ABSTRACT

A silicone composition that contains an organopolysiloxane having at least two aliphatic unsaturated hydrocarbon groups per molecule, a filler containing an aluminum powder and a zinc oxide powder, an organohydrogenpolysiloxane having two or more SiH groups per molecule, and a platinum group metal catalyst, in which when a storage and loss elastic modulus G" of the silicone composition is measured by means a viscoelasticity measurement apparatus capable of measuring shear modulus, the silicone composition can provide a cured product wherein G' after 3,000 seconds from the start of holding is 10,000 Pa or less, G' after 7,200 seconds from the start of holding is 100,000 Pa or less, and G' exceeds G" after 800 seconds or more from the start of holding. As a result, there is provided a silicone composition excellent in crushability, spreadability, and heat conductivity.

4 Claims, No Drawings

(56) References Cited

FOREIGN PATENT DOCUMENTS

| JP | 2011246536 A | 12/2011 |
|----|--------------|---------|
| JP | 4913874 B2   | 4/2012  |
| JP | 4917380 B2   | 4/2012  |
| JP | 2012-096361 A| 5/2012  |
| JP | 4933094 B2   | 5/2012  |
| JP | 2012102283 A | 5/2012  |

OTHER PUBLICATIONS

Oct. 10, 2017 Office Action issued in Chinese Patent Application No. 201480029904.5.
Feb. 23, 2018 Office Action issued in Chinese Patent Application No. 201480029904.5.
Dec. 8, 2017 Office Action issued in U.S. Appl. No. 14/786,676.
Nov. 15, 2017 Office Action issued in Chinese Patent Application No. 201480051764.1.
Jul. 3, 2018 Office Action issued in Chinese Application No. 201480051764.1.
Apr. 23, 2018 Office Action issued in Chinese Patent Application No. 201480051764.1.

\* cited by examiner

SILICONE COMPOSITION AND METHOD FOR MANUFACTURING HEAT-CONDUCTIVE SILICONE COMPOSITION

This is a Continuation of application Ser. No. 14/914,100 filed Feb. 24, 2016, which in turn is a National Stage of PCT Application PCT/JP2014/003157, filed Jun. 13, 2014, which claims priority to JP 2013-194880, filed Sep. 20, 2013. The disclosure of the prior applications is hereby incorporated by reference herein in its entirety.

TECHNICAL FIELD

The present invention relates to a silicone composition and a method for manufacturing a heat-conductive silicone composition.

BACKGROUND ART

It is widely known that electronic parts such as semiconductor packages generate heat in use, thereby lowering the performance thereof. To solve this problem, various heat dissipating techniques have been used. One typical method is to provide a cooling member such as a heat spreader in the vicinity of a heat-generating part and bring them into close contact to effectively remove heat through the cooling member.

In this case, if there is a space between the heat-generating member and the cooling member, thermal conduction does not proceed smoothly because of the presence of air, which is poor in heat conductivity, and therefore, the temperature of the heat-generating member cannot be sufficiently reduced. To prevent such phenomena, there have been conventionally used, for the purpose of preventing the presence of air, heat-dissipating greases or heat-dissipating sheets that have good heat conductivity and followability to the surface of the member (Patent Literatures 1 to 11).

A thin and compressible heat-dissipating grease is suitable for measures against heat of semiconductor packages in view of heat-dissipating performance. Particularly, it is preferable, in view of reliability, to use a thermosetting heat-dissipating grease that hardly causes outflow of the grease (pumping out) due to the thermal history between heating and cooling of the heat-generating part. In general, a thermosetting heat-dissipating grease contains a reaction retarder in many cases, so that the grease is not cured for a certain time at room temperature even after applied to a heat-generating part. Accordingly, even if a certain time passes after the heat-dissipating grease is applied, the heat-dissipating grease can be compressed and thermally cured into a desired thickness after a cooling member such as a heat spreader is placed thereon, and thus, good crushability can be achieved.

On the other hand, semiconductor packages progress toward miniaturization in recent years, and along with this current, application to finer pattern and less application amount are required in heat-dissipating greases. In these cases, the reaction retarder tends to volatilize due to the increase in surface area of the applied heat-dissipating grease or other factors, which leads to acceleration of the curing reaction. Therefore, the heat-dissipating grease cannot be compressed into a desired thickness when the heat-dissipating grease is thermally cured after a cooling member such as a heat spreader is placed thereon, that is, resulting poor crushability. In addition, the applied heat-dissipating grease cannot sufficiently spread over the whole heat-generating part. Thus, there is a problem of insufficient heat-dissipating performance,

CITATION LIST

Patent Literature

PATENT LITERATURE 1: Japanese Patent No. 2938428
PATENT LITERATURE 2: Japanese Patent No. 2938429
PATENT LITERATURE 3: Japanese Patent No. 3580366
PATENT LITERATURE 4: Japanese Patent No. 3552184
PATENT LITERATURE 5: Japanese Patent No. 4572243
PATENT LITERATURE 6: Japanese Patent No. 4656340
PATENT LITERATURE 7: Japanese Patent No. 4913874
PATENT LITERATURE 8: Japanese Patent No. 4917380
PATENT LITERATURE 9: Japanese Patent No. 4933094
PATENT LITERATURE 10: Japanese Unexamined Patent publication (Kokai) No. 2012-102283
PATENT LITERATURE 11: Japanese Unexamined Patent publication (Kokai) No. 2012-96361

SUMMARY OF INVENTION

Technical Problem

The present invention was accomplished in view of the above-described problems. It is an object of the present invention to provide a silicone composition excellent in crushability, spreadability, and heat conductivity, and further provide a method for manufacturing a heat-conductive silicone composition.

Solution to Problem

To achieve this object, the present invention provides a silicone composition comprising: (A) 100 parts by mass of an organopolysiloxane having at least two aliphatic unsaturated hydrocarbon groups per molecule, and having a kinematic viscosity at 25° C. of 60 to 100,000 mm$^2$/s; (B) 100 to 2,000 parts by mass of a filler containing an aluminum powder and a zinc oxide powder; (C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5; and (D) a platinum group metal catalyst in an amount of 0.1 to 500 ppm in terms of platinum with respect to the component wherein when a storage elastic modulus G' and a loss elastic modulus G" of the silicone composition is measured, by means of a viscoelasticity measurement apparatus capable of measuring shear modulus, while holding the silicone composition at 150° C. for 7,200 seconds after the silicone composition is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min, the silicone composition can provide a cured product in which the storage elastic modulus G' after 3,000 seconds from the start of holding is 10,0001 Pa or less, the storage elastic modulus G' after 7,200 seconds from the start of holding is 100,000 Pa or less, and the storage elastic modulus G' exceeds the loss elastic modulus G" after 800 seconds or more from the start of holding.

Such a silicone composition enables a heat-dissipating grease formed from the composition to be compressed into a desired thickness when the heat-dissipating grease is thermally cured after a cooling member such as a heat spreader is placed thereon even in the case that the heat-dissipating grease is applied to a fine pattern and/or with a little amount, and also enables the applied heat-dissipating grease to sufficiently spread over the whole heat-generating part. Therefore, sufficient heat-dissipating performance can be obtained.

The silicone composition preferably further comprise (E) 1 to 200 parts by mass of a hydrolytic methylpolysiloxane represented by the general formula (1), based on 100 parts by mass of the component (A),

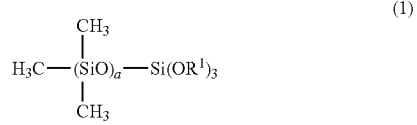

(1)

wherein $R^1$ represents an alkyl group having 1 to 6 carbon atoms; and "a" is an integer of 5 to 100.

When such a hydrolytic methylpolysiloxane is contained, sufficient wettability can be exhibited, and curing reaction progresses sufficiently, whereby outflow of the grease can be prevented.

The silicone composition preferably further comprises (F) 0.05 to 1.0 part by mass of one or more retarders selected from the group consisting of acetylene compounds, nitrogen compounds, organophosphorous compounds, oxime compounds, and organochlorine compounds, based on 100 parts by mass of the component (A).

When the component (F) is contained, it functions as a retarder and suppresses progress of the hydrosilylation reaction at room temperature, whereby the shelf life or the pot life can be extended.

In addition, the present invention provides a heat-dissipating grease obtained by curing the silicone composition of the present invention.

Since the silicone composition of the present invention is excellent in crushability, spreadability, and heat conductivity, the heat-dissipating grease which is a cured product of the silicone composition has excellent heat conductivity and quality characteristics.

Further, the present invention provides a method for manufacturing a heat-conductive silicone composition, comprising the steps of: producing a silicone composition containing (A) 100 parts by mass of an organopolysiloxane having at least two aliphatic unsaturated hydrocarbon groups per molecule, and having a kinematic viscosity at 25° C. of 60 to 100,000 mm²/s, (B) 100 to 2,000 parts by mass of a filler containing an aluminum powder and a zinc oxide powder, (C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5, and (D) a platinum group metal catalyst in an amount of 0.1 to 500 ppm in terms of platinum with respect to the component (A); measuring a storage elastic modulus G' and a loss elastic modulus G" of the silicone composition, by means of a viscoelasticity measurement apparatus capable of measuring shear modulus, while holding the silicone composition at 150° C. for 7,200 seconds after the silicone composition is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min; and selecting a heat-conductive silicone composition that can provide a cured product in which the storage elastic modulus G' after 3,000 seconds from the start of holding is 10,000 Pa or less, the storage elastic modulus G' after 7,200 seconds from the start of holding is 100,000 Pa or less, and the storage elastic modulus exceeds the loss elastic modulus G" after 800 seconds or more from the start of holding.

In this way, when the method for manufacturing a heat-conductive silicone composition including selecting a silicone composition satisfying the desired requirements is employed, a heat-conductive silicone composition having excellent crushability and spreadability can be stably obtained.

Advantageous Effects Invention

The silicone composition of the present invention is excellent in heat conductivity, and even in the case that a heat-dissipating grease formed from the composition is applied to a fine pattern and/or with a little amount, the heat-dissipating grease can be compressed into a desired thickness when the heat-dissipating grease is thermally cured after a cooling member such as a heat spreader is placed thereon; and in addition, the applied heat-dissipating grease can sufficiently spread over the whole heat-generating part. Therefore, sufficient heat-dissipating performance can be obtained. Further, when the method for manufacturing a heat-conductive silicone composition of the present invention is employed, a heat-conductive silicone composition having excellent crushability and spreadability can be surely obtained.

DESCRIPTION OF EMBODIMENTS

Hereinafter, the present invention will be described in More detail.

As described above, it has been desired to develop a silicone composition in which, even in the case that the composition is applied to a fine pattern and/or with a little amount as a heat-dissipating grease, the heat-dissipating grease can be compressed into a desired thickness when the heat-dissipating grease is thermally cured after a cooling member such as a heat spreader is placed thereon, and the applied heat-dissipating grease can sufficiently spread over the whole heat-generating part.

The present inventors diligently studied to achieve the above object, and consequently found that the silicone composition containing the components (A) to (D) and optionally containing the components (E) and (F), in which the composition satisfies the specific requirements of the storage elastic modulus G' and the time necessary for the storage elastic modulus G' to exceed the loss elastic modulus G" when the storage elastic modulus G' and the loss elastic modulus G" of the silicone composition is measured by a viscoelasticity measurement apparatus capable of measuring shear modulus, enables a heat-dissipating grease formed from the composition to be compressed into a desired thickness when the heat-dissipating grease is thermally cured after a cooling member such as a heat spreader is placed thereon even in the case that the heat-dissipating grease is applied to a fine pattern and/or with a little amount, and also enables the applied heat-dissipating grease to sufficiently spread over the whole heat-generating part, so that sufficient heat-dissipating performance can be obtained, thereby brought the present invention to completion.

Hereinafter, the silicone composition of the present invention will be described in detail, but the present invention is not limited thereto.

The silicone composition of the present invention contains (A) 100 parts by mass of an organopolysiloxane having at least two aliphatic unsaturated hydrocarbon groups per molecule, and having a kinematic viscosity at 25° C. of 60 to 100,000 mm$^2$/s; (B) 100 to 2,000 parts by mass of a filler containing an aluminum powder and a zinc oxide powder; (C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5; and (D) a platinum group metal catalyst in an amount of 0.1 to 500 ppm in terms of platinum with respect to the component (A); and when a storage elastic modulus G' and a loss elastic modulus G" of the silicone composition is measured, by means of a viscoelasticity measurement apparatus capable of measuring shear modulus, while holding the silicone composition at 150° C. for 7,200 seconds after the silicone composition is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min, the silicone composition can provide a cured product in which the storage elastic modulus G' after 3,000 seconds from the start of holding is 10,000 Pa or less, the storage elastic modulus G' after 7,200 seconds from the start of holding is 100,000 Pa or less, and the storage elastic modulus G' exceeds the loss elastic modulus G" after 800 seconds or more from the start of holding.

When the storage elastic modulus G' and the loss elastic modulus G" of the silicone composition is measured by means of a viscoelasticity measurement apparatus capable of measuring shear modulus under the above temperature increase conditions and high-temperature holding condition, if the storage elastic modulus G' after 3,000 seconds from the start of holding exceeds 10,000 Pa, or the storage elastic modulus G' after 7,200 seconds from the start of holding exceeds 100,000 Pa, or the storage elastic modulus G' exceeds the loss elastic modulus G" in less than 800 seconds from the start of holding, there is fear that the heat-dissipating grease formed from the composition cannot be compressed into a desired thickness when the heat-dissipating grease is thermally cured after a cooling member such as a heat spreader is placed thereon in the case that the heat-dissipating grease is applied to a fine pattern and/or with a little amount, and that the applied heat-dissipating grease cannot sufficiently spread over the whole heat-generating part.

Hereinafter, each component constituting the silicone composition of the present invention will be described in more detail.

[Component (A)]

The component (A) is an organopolysiloxane having at least two aliphatic unsaturated hydrocarbon groups per molecule, and having a kinematic viscosity at 25° C. of 60 to 100,000 mm$^2$/s. The aliphatic unsaturated hydrocarbon group is preferably a monovalent hydrocarbon group containing aliphatic unsaturated bond and having 2 to 8 carbon atoms, more preferably 2 to 6 carbon atoms, and it is much more preferably an alkenyl group. Examples thereof include alkenyl groups such as a vinyl group, an allyl group, a propenyl group, an isopropenyl group, a butenyl group, a hexenyl group, a cyclohexenyl group, and an octenyl group. A vinyl group is particularly preferred. The aliphatic unsaturated hydrocarbon group may be bonded to either silicon atoms in terminals of the molecular chain or silicon atoms within the molecular chain, or may be bonded to both of them.

The organopolysiloxane has a kinematic viscosity at 25° C. of 60 to 100,000 mm$^2$/s, preferably 100 to 30,000 mm$^2$/s. If the kinematic viscosity less than 60 mm$^2$/s, there is fear that physical properties of the silicone composition are lowered, whereas if it exceeds 100,000 mm$^2$/s, the silicone composition may become poor in spreadability.

In the present invention, the kinematic viscosity is a value measured by Ubbelohde-type Oswald viscometer at 25° C.

The molecular structure of the organopolysiloxane is not particularly limited so long as it has the above-mentioned properties, and examples thereof include linear structure, branched structure, and linear structure having partially branched or cyclic structure. Particularly preferable is a linear structure in which the main chain is composed of diorganosiloxane repeating units and both terminals of the molecular chain are blocked with triorganosiloxy groups. Organopolysiloxane having said linear structure may have a partially branched or cyclic structure. The organopolysiloxane may be used solely or in combination of two or more kinds.

An organic group bonded to silicon atoms in the organopolysiloxane other than the aliphatic unsaturated hydrocarbon group is a substituted or unsubstituted monovalent hydrocarbon group having 1 to 18 carbon atoms, preferably 1 to 10 carbon atoms, more preferable 1 to 8 carbon atoms. Examples thereof include alkyl groups such as methyl group, ethyl group, propyl group, isopropyl group, butyl group, isobutyl group, tent-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenethyl group, and phenylpropyl group; and groups in which a part or whole of hydrogen atoms in these groups are substituted with halogen atoms such as fluorine, bromine, and chlorine or cyano groups, such as chloromethyl group, chloropropyl group, bromoethyl group, trifluoropropyl group, and cyanoethyl group. Particularly, methyl group is preferred.

[Component (B)]

The component (B) is a heat-conductive filler containing an aluminum powder and a zinc oxide powder. In the present invention, the shape of the aluminum powder is not particularly limited, and may be spherical, irregular shape, or other shape. The surface of the aluminum powder may be previously treated. The aluminum powder preferably has an average particle size of 0.1 to 100 μm, more preferably 1 to 40 μm. If the average particle size of the aluminum powder is 0.1 μm or more, viscosity of the resulting composition is not too high, and thus, there is no fear that the spreadability thereof becomes poor. If it is 100 μm or less, the resulting composition becomes homogeneous.

In the present invention, as the aluminum powder, an aluminum powder having a large average particle size or small average particle size may be used alone, but it is preferred to mixedly used an aluminum powder having a large average particle size (e.g. 5 μm or more and 100 μm or less, preferably 10 μm or more and 100 μm or less, more preferably 10 μm or more and 50 μm or less) and an aluminum powder having a small average particle size (e.g.

0.1 μm or more and 10 μm or less, preferably 0.1 μm or more and 5 μm or less, more preferably 1 μm or more and 5 μm or less).

The mixing ratio may be adjusted according to a desired viscosity of the grease, and it is particularly preferred that the mass ratio of the aluminum powder having a large average particle size to the aluminum powder having a small average particle size range from 0.5 to 9.0, more preferably from 1.0 to 5.0. In addition, by using the two aluminum powders having different particle sizes and the zinc oxide powder as (B) the filler of the silicone composition of the present invention, the composition of the present invention exhibits more excellent viscosity. Thus, the grease formed from the composition also exhibits excellent viscosity.

In the present invention, the shape of the zinc oxide powder is not particularly limited, and may be spherical, irregular shape, or other shape. The zinc oxide powder preferably has an average particle size of 0.1 to 10 μm, more preferably 1 to 4 μm. If the average particle size of the zinc oxide powder is 0.1 μm or more, there is no fear that the resulting composition exhibits a high viscosity, and that the spreadability thereof becomes poor. If it is 10 μm or less, the resulting composition becomes homogeneous.

In the present invention, the "average particle size" indicates the particle size of 50% integrated value in the particle size distribution based on volume measured by a laser diffractive-scattering method. The measurement using the laser diffractive-scattering method can be performed, for example, by a Microtrack particle size analyzer MT3300EX, (manufactured by Nikkiso Co., Ltd.).

In the present invention, (B) the filler may further contain, besides the aluminum powder and the zinc oxide powder, a known heat-conductive filler such as titanium oxide powder, alumina powder, boron nitride powder, aluminum nitride powder, diamond powder, gold powder, silver powder, copper powder, carbon powder, nickel powder, indium powder, gallium powder, metallic silicon powder, and silica powder, depending on the purpose.

The amount of (B) the filler is 100 to 2,000 parts by mass, preferably 200 to 1,800 parts by mass, more preferably 400 to 1,800 parts by mass, based on 100 parts by mass of the component (A). If the amount of the filler is less than 100 parts by mass, the resulting composition may become poor in heat conductivity. If the amount exceeds 2,000 parts by mass, the composition may become poor in spreadability.

[Component (C)]

The component (C) is an organohydrogenpolysiloxane having two or more, preferably three or more, particularly preferably 3 to 100, further preferably 3 to 20 silicon-bonded hydrogen atoms (i.e. SiH groups) per molecule. The organohydrogenpolysiloxane may be any materials so long as the SiH groups in the molecule are subjected to addition reaction with the aliphatic unsaturated hydrocarbon groups contained in the component (A) in the presence of a later-described platinum group metal catalyst to form a crosslinking structure.

The molecular structure of the organohydrogen-polysiloxane is not particularly limited so long as it has the above-mentioned properties, and examples thereof include linear structure, branched structure, cyclic structure, and linear structure having partially branched or cyclic structure. Particularly preferable is linear or cyclic structure. The organohydrogenpolysiloxane preferably has a kinematic viscosity at 25° C. of 1.0 to 1,000 mm$^2$/s, more preferably 10 to 100 mm$^2$/s. If the kinematic viscosity is 1.0 mm$^2$/s or more, there is no fear that physical properties of the silicone composition are lowered. If it is 1,000 mm$^2$/s or less, there is no fear that the spreadability of the silicone composition becomes poor.

As the organic group bonded to silicon atoms in the organohydrogenpolysiloxane, there may be mentioned a monovalent hydrocarbon group other than an aliphatic unsaturated hydrocarbon group, in particular, an unsubstituted or substituted monovalent hydrocarbon group having 1 to 12 carbon atoms, preferably 1 to 10 carbon atoms. Examples thereof include alkyl groups such as methyl group, ethyl group, propyl group, butyl group, hexyl group, and dodecyl group; aryl groups such as phenyl group; aralkyl groups such as 2-phenethyl group and 2-phenylpropyl group; groups in which a part or whole of hydrogen atoms in these groups are substituted with halogen atoms such as fluorine, bromine, and chlorine or cyano groups, such as chloromethyl group, chloropropyl group, bromoethyl group, trifluoropropyl group, and cyanoethyl group; and epoxy ring-containing organic groups (alkyl groups substituted with glycidyl group or glycidyloxy group) such as 2-glycidoxyethyl group, 3-glycidoxypropyl group, and 4-glycidoxybutyl group. The organohydrogenpolysiloxane may be used solely or in combination of two or more kinds.

The amount of (C) the organohydrogenpolysiloxane is such an amount that the ratio of a number of the SiH groups in the component (C) to a total number of the aliphatic unsaturated hydrocarbon groups in the component (A) is in the range of 0.5 to 1.5, If the amount of the component (C) is less than 0.5, there is fear that the curing reaction does not proceed sufficiently, and thus outflow of the grease occurs. If it exceeds 1.5, unreacted SiH groups may cause excess crosslinking reaction, so that it becomes difficult to compress the heat-dissipating grease into a prescribed thickness during thermal curing, and to sufficiently spread the applied heat-dissipating grease over the whole heat-generating part, which may result in insufficient heat-dissipating performance.

[Component (D)]

The component (D) is a platinum group metal catalyst, which serves to accelerate the addition reaction mentioned above. As the platinum group metal catalyst, conventionally known materials used for addition reaction can be used. Examples thereof include platinum-based, palladium-based, rhodium-based, and ruthenium-based catalyst. Among them, platinum and a platinum compound are preferred because of relatively high availability thereof. For example, simple platinum, platinum black, chloroplatinic acid, platinum-olefin complexes, platinum-alcohol complexes, and platinum coordination compounds may be mentioned. The platinum-based catalyst may be used solely or in combination of two or more kinds.

The amount of the component (D) is 0.1 to 500 ppm, preferably 1.0 to 100 ppm in terms of platinum group metal atoms relative to the component (A) on the basis of mass if the amount of the catalyst is less than 0.1 ppm, there is fear that no catalytic effect is expected. If it exceeds 500 ppm, the catalytic effect does not increase, resulting in poor economy, so that it is not preferable.

[Component (E)]

The silicone composition of the present invention may further contain a hydrolytic methylpolysiloxane represented by the formula (1).

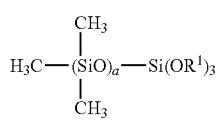

(1)

In the formula (1), $R^1$ represents an alkyl group having 1 to 6 carbon atoms; and examples thereof include methyl group, ethyl group, propyl group, isopropyl group, butyl group, sec-butyl group, tert-butyl group, pentyl group, and hexyl group. "a" is an integer of 5 to 100. If the value of "a" is 5 or more, oil-bleeding from the silicone composition does not become prominent, and sufficient reliability can be obtained. If the value of "a" is 100 or less, wettability to the filler becomes sufficient.

The amount of the component (E) is 1 to 200 parts by mass, preferably 10 to 150 parts by mass, more preferably 20 to 100 parts by mass, based on 100 parts by mass of the component (A). If the amount of the component (E) is 1 part by mass or more, sufficient wettability can be expressed. If the amount of the component (E) is 200 parts by mass or less, curing reaction proceeds sufficiently, and there is no fear that outflow of the grease occurs.

[Component (F)]

The silicone composition of the present invention may further contain component (F), a retarder. The retarder serves to suppress the progress of the hydrosilylation reaction at room temperature, and is used for extending shelf life or pot life. As the retarder, a conventionally known retarder used for an addition-curable silicone composition can be used. Examples thereof include acetylene compounds such as acetylene alcohols (e.g., ethynylmethyldecylcarbinol, 1-ethynyl-1-cyclohexanol and 3,5-dimethyl-1-hexyn-3-ol); various nitrogen compounds such as tributylamine, tetramethylethylenediamine, and benzotriazol; organophosphorus compounds such as triphenylphosphine; oxime compounds; and organochlorine compounds.

The amount of the component (F) is 0.05 to 1.0 part by mass, preferably 0.1 to 1.0 part by mass, based on 100 parts by mass of the component (A). If the amount of the retarder is 0.05 part by mass or more, a desired sufficient shelf life or pot life can be obtained. If it is 1.0 part by mass or less, there is no fear that curability of the silicone composition is lowered, so that it is preferable.

The retarder may be diluted with organo(poly)siloxane, toluene, or the like to enhance dispersibility to the silicone composition.

[Other Additives]

The silicone composition of the present invention may contain unreactive organo(poly)siloxane such as methylpolysiloxane to adjust elasticity and viscosity of the composition. In addition, to prevent deterioration of the silicone composition, a conventionally known antioxidant such as 2,6-di-t-butyl-4-methylphenol may be added, if necessary. Further, a dye, a pigment, a flame retardant, a precipitation-inhibitor, a thixotropy-enhancer, or other additives may be blended, if necessary.

Next, the method for manufacturing a heat-conductive silicone composition of the present invention will be described, but it is not limited thereto.

The method for manufacturing a heat-conductive silicone composition of the present invention includes the steps of: producing a silicone composition that contains the above components (A) to (D) and, in addition to these, may further contains components (E) and (F); measuring a storage elastic modulus G' and a loss elastic modulus G" of the produced silicone composition by means of a viscoelasticity measurement apparatus capable of measuring shear modulus under the above temperature increase conditions and high-temperature holding condition; and selecting a silicone composition that can provide a cured product in which measured values of the storage elastic modulus G' and the loss elastic modulus G" satisfy the desired requirements.

[Step of Producing Silicone Composition]

A method for producing the silicone composition in the present invention may follow the conventional method for producing a silicone grease composition, and is not particularly limited. For example, the composition can be produced by mixing the components (A) to (F) and any other optional components with a mixer such as a Trimix, Twinmix or Planteary Mixer (all registered trademarks for mixers manufactured by Inoue Manufacturing Co., Ltd.), an Ultramixer (a registered trademark for a mixer manufactured by Mizuho Industrial Co., Ltd.), and a Hivis Disper Mix (a registered trademark for a mixer manufactured by PRIMIX Corporation).

The silicone composition of the present invention preferably has a viscosity measured at 25° C. of 3.0 to 300 Pa·s, more preferably 5.0 to 200 Pa·s. The viscosity of 3.0 Pa·s or more is preferable because there is no fear that the workability is lowered. The above viscosity can be achieved by adjusting the composition of the respective components. In the present invention, the viscosity is a value measured at 25° C. by a Malcolm viscometer (at 10 rpm with Rotor-A, and at a shear rate of 6 [1/s]).

[Step of Measuring Storage Elastic Modulus G' and Loss Elastic Modulus G"]

The produced silicone composition is heated from 25° C. to 125° C. at a temperature increase rate of 10° C./min, from 125° C. to 145° C. at a temperature increase rate of 2° C./min, and from 145° C. to 150° C. at a temperature increase rate of 0.5° C./min, and then, a storage elastic modulus G' and a loss elastic modulus G" of the silicone composition is measured while holding the silicone composition at 150° C. for 7,200 seconds, by using a viscoelasticity measurement apparatus capable of measuring shear modulus. As an example of the apparatus used in this step, there may be mentioned a viscoelasticity measurement apparatus (Type RDAIII, manufactured by Rheometric Scientific Ltd.).

[Step of Selecting Silicone Composition]

Then, a silicone composition that can provide a cured product in which the storage elastic modulus G' after 3,000 seconds from the start of holding is 10,000 Pa or less, the storage elastic Modulus G' after 7,200 seconds from the start of holding is 100,000 Pa or less, and the storage elastic modulus G' exceeds the loss elastic modulus G" after 800 seconds or more from the start of holding, is selected.

That is, in the manufacturing of a heat-conductive silicone composition, only compositions satisfying the above requirements are selected from the produced silicone compositions. As a result, a heat-conductive silicone composition excellent in crushability and spreadability can be surely obtained.

The silicone composition (heat-conductive silicone composition) of the present invention can be suitably used, as well as the conventional heat-conductive silicone grease, for dissipating heat by placing the composition between a cooling member and a heat-generating member such as electronic parts of a semiconductor package to conduct heat from the heat-generating member to the cooling member. In particular, it is effective for the case where the heat-dissipating grease is applied to a fine pattern and/or with a little amount. The curing conditions when the silicone composition of the present invention is thermally cured are not particularly limited, but generally 80 to 200° C., preferably 100 to 180° C., for 30 minutes to 4 hours, preferably 30 minutes to 2 hours.

EXAMPLES

Hereinafter, the present invention will be more specifically described with reference to examples and comparative examples, but the present invention is not limited to the following examples.

Examples 1 to 18 and Comparative examples 1 to 14

The following components (A) to (F) were mixed as described below to obtain compositions of Examples 1 to 18 and Comparative examples 1 to 14.

That is, the components (A), (B), and (E) were placed into a 5-L Planteary Mixer (manufactured by Inoue Manufacturing Co., Ltd.) with the blending ratio shown in Tables 1 to 4, and mixed for 1 hour at 170° C. Then, the components (C), (D), and (F) were added thereto, and mixed homogeneously.

The respective components used in examples and comparative examples are shown below. In the following, the kinematic viscosity is a value measured by Ubbelohde-type Oswald viscometer (manufactured by Sibata scientific technology Ltd.) at 25° C.

[Component (A)]

A-1: dimethylpolysiloxane having a kinematic viscosity at 25° C. of 600 mm²/s in which both terminals are blocked with dimethylvinylsilyl groups.

A-2: dimethylpolysiloxane having a kinematic viscosity at 25° C. of 700 mm²/s in which both terminals are blocked with trimethylsilyl groups and two of methyl groups bonded to silicon atoms within the molecular chain are vinyl groups.

[Component (B)]

B-1: an aluminum powder having an average particle size of 10.0 μm (heat conductivity: 237 W/m·° C.)

B-2: a zinc oxide powder having an average particle size of 1.0 μm (heat conductivity: 25 W/m·° C.)

[Component (C)]

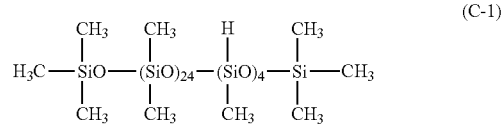
(C-1)

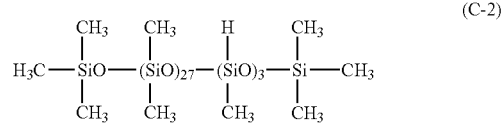
(C-2)

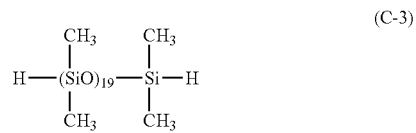
(C-3)

[Component (D)]

D-1: a solution in which a platinum-divinyltetramethyl-disiloxane complex was dissolved in the same dimethylpolysiloxane as A-1 (platinum atom content: 1% by mass).

[Component (E)]

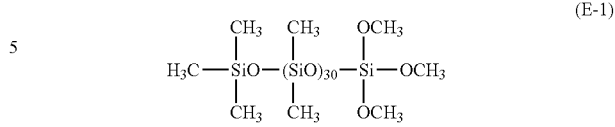
(E-1)

[Component (F)]

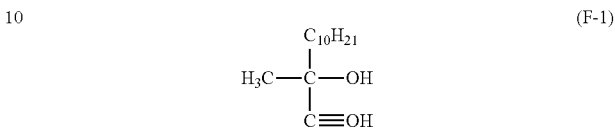
(F-1)

The following properties were measured with respect to these compositions.

[Storage Elastic Modulus and Time Required for storage Elastic Modulus to Exceed Loss Elastic Modulus]

The silicone composition was applied between two parallel plates each having a diameter of 2.5 cm so as to give a thickness of 2 mm. Then, a program was constructed for heating the coated plates from 25° C. to 125° C. at a temperature increase rate of 10° C./min, from 125° C. to 145° C. at a temperature increase rate of 2° C./min, and from 145° C. to 150° C. at a temperature increase rate of 0.5° C./min and then holding them at 150° C. for 7,200 seconds. After that, storage elastic modulus after 3,000 seconds and 7,200 seconds from the start of holding at 150° C. and the time required for the storage elastic modulus to exceed the loss elastic modulus were measured. The measurement was performed using a viscoelasticity measurement apparatus (Type: RDAIII, manufactured by Rheometric Scientific Ltd.).

[Viscosity]

The absolute viscosity of the silicone composition was measured by a Malcolm viscometer (type: PC-1T) at 25° C.

[Heat Conductivity]

The silicone composition was wrapped with kitchen wrap and measured by TPA-501 manufactured by Kyoto electronics manufacturing Co., Ltd.

[Crushability Test]

6 mg of the silicone composition was applied onto a silicon wafer (10 mm×10 mm), and left to stand at 25° C. for 4 hours. Thereafter, another silicon wafer with the same size was placed thereon, and the composition was cured at 150° C. for 2 hours under a pressure of 10 gf. Then, the thickness of the silicone composition was measured.

[Spreadability Test]

The test sample used in the crushability test was separated into two silicon wafers, and (area covered with the silicone composition)/(area of the silicon wafer) was calculated.

Measurement results of storage elastic modulus, a time required for the storage elastic modulus to exceed the loss elastic modulus, viscosity, and heat conductivity, and results of the crushability test and the spreadability test of the obtained compositions were shown in Tables 1 to 4. Examples 1 to 18 are shown in Tables 1 and 2, and Comparative examples 1 to 14 are shown in Tables 3 and 4. SiH/SiVi (number ratio) indicates the ratio of the number of SiH groups in the components (C) to the total number of aliphatic unsaturated hydrocarbon groups in the component (A).

TABLE 1

|  | Example 1 | Example 2 | Example 3 | Example 4 | Example 5 | Example 6 | Example 7 | Example 8 | Example 9 |
|---|---|---|---|---|---|---|---|---|---|
| A-1 | 100 |  | 100 | 100 |  |  | 100 | 100 | 100 |
| A-2 |  | 100 |  |  | 100 | 100 |  |  |  |
| B-1 | 814 | 814 | 1240 | 600 | 1240 | 600 | 814 | 814 | 814 |
| B-2 | 100 | 100 | 152 | 74 | 152 | 74 | 100 | 100 | 100 |
| Total amount of filler | 914 | 914 | 1392 | 674 | 1392 | 674 | 914 | 914 | 914 |
| C-1 | 7.9 | 7.4 | 7.9 | 7.9 | 7.4 | 7.4 |  | 4.7 | 4.0 |
| C-2 |  |  |  |  |  |  | 11.7 |  |  |
| C-3 |  |  |  |  |  |  |  | 4.6 |  |
| D-1 | 0.06 | 0.06 | 0.06 | 0.06 | 0.06 | 0.06 | 0.06 | 0.06 | 0.06 |
| E-1 | 100 | 100 | 100 | 100 | 100 | 100 | 100 | 100 | 100 |
| F-1 | 0.4 | 0.4 | 0.4 | 0.4 | 0.4 | 0.4 | 0.4 | 0.4 | 0.4 |
| SiH/SiVi (number ratio) | 1.0 | 1.0 | 1.0 | 1.0 | 1.0 | 1.0 | 1.0 | 1.0 | 0.5 |
| Storage elastic modulus G' (after 3,000 sec) | 6,450 | 2,430 | 7,090 | 5,840 | 3,010 | 2,400 | 2,280 | 8,380 | 850 |
| Storage elastic modulus G' (after 7,200 sec) | 46,900 | 41,990 | 55,020 | 40,590 | 48,370 | 37,220 | 26,270 | 38,550 | 4,690 |
| Time required for storage elastic modulus to exceed loss elastic modulus (sec) | 1,620 | 917 | 1,300 | 1,760 | 856 | 1,010 | 2,140 | 940 | 1,910 |
| Viscosity (Pa·s) | 9.7 | 10.0 | 31 | 5.0 | 33 | 5.5 | 8.6 | 9.5 | 10.1 |
| Heat conductivity (W/m·°C.) | 2.0 | 2.0 | 3.0 | 1.1 | 3.0 | 1.2 | 1.9 | 2.0 | 2.0 |
| Thickness of silicone composition after crushability test (μm) | 40 | 38 | 48 | 35 | 47 | 33 | 37 | 43 | 32 |
| Result of spreadability test (area covered with silicone composition/area of silicon wafer) | 0.71 | 0.75 | 0.55 | 0.86 | 0.57 | 0.89 | 0.78 | 0.66 | 0.88 |

TABLE 2

|  | Example 10 | Example 11 | Example 12 | Example 13 | Example 14 | Example 15 | Example 16 | Example 17 | Example 18 |
|---|---|---|---|---|---|---|---|---|---|
| A-1 | 100 | 100 | 100 | 100 |  | 100 |  | 100 |  |
| A-2 |  |  |  |  | 100 |  | 100 |  | 100 |
| B-1 | 814 | 814 | 814 | 814 | 814 | 814 | 814 | 814 | 814 |
| B-2 | 100 | 100 | 100 | 100 | 100 | 100 | 100 | 100 | 100 |
| Total amount of filler | 914 | 914 | 914 | 914 | 914 | 914 | 914 | 914 | 914 |
| C-1 | 5.5 |  |  |  |  | 7.9 | 7.4 | 7.9 | 7.4 |
| C-2 |  | 14.1 | 17.6 | 11.7 | 11.0 |  |  |  |  |
| C-3 |  |  |  |  |  |  |  |  |  |
| D-1 | 0.06 | 0.06 | 0.06 | 0.09 | 0.09 | 0.06 | 0.06 | 0.06 | 0.06 |
| E-1 | 100 | 100 | 100 | 100 | 100 | 70 | 70 | 100 | 100 |
| F-1 | 0.4 | 0.4 | 0.4 | 0.4 | 0.4 | 0.4 | 0.4 | 0.6 | 0.6 |
| SiH/SiVi (number ratio) | 0.7 | 1.2 | 1.5 | 1.0 | 1.0 | 1.0 | 1.0 | 1.0 | 1.0 |
| Storage elastic modulus G' after 3,000 sec | 1,160 | 6,460 | 9,110 | 8,770 | 7,080 | 8,620 | 7,460 | 960 | 860 |
| Storage elastic modulus G' after 7,200 sec | 10,690 | 65,710 | 97,300 | 69,310 | 65,190 | 68,400 | 62,880 | 11,590 | 9,720 |
| Time required for storage elastic modulus to exceed loss elastic modulus (sec) | 1,870 | 1,420 | 839 | 1,010 | 830 | 1,050 | 810 | 1,960 | 1,800 |

TABLE 2-continued

|  | Example 10 | Example 11 | Example 12 | Example 13 | Example 14 | Example 15 | Example 16 | Example 17 | Example 18 |
|---|---|---|---|---|---|---|---|---|---|
| Viscosity (Pa · s) | 9.9 | 8.0 | 7.5 | 8.8 | 9.1 | 19.4 | 20.3 | 9.2 | 9.8 |
| Heat conductivity (W/m · °C.) | 2.0 | 1.9 | 1.8 | 1.9 | 2.0 | 2.5 | 2.5 | 2.0 | 2.0 |
| Thickness of silicone composition after crushability test (μm) | 34 | 42 | 50 | 41 | 40 | 52 | 52 | 36 | 34 |
| Result of spreadability test (area covered with silicone composition/area of silicon wafer) | 0.83 | 0.66 | 0.54 | 0.69 | 0.70 | 0.51 | 0.50 | 0.80 | 0.84 |

TABLE 3

|  | Comparative example 1 | Comparative example 2 | Comparative example 3 | Comparative example 4 | Comparative example 5 | Comparative example 6 |
|---|---|---|---|---|---|---|
| A-1 | 100 |  | 100 | 100 | 100 | 100 |
| A-2 |  | 100 |  |  |  |  |
| B-1 | 1900 | 1900 | 814 | 814 | 814 | 814 |
| B-2 | 233 | 233 | 100 | 100 | 100 | 100 |
| Total amount of filler | 2133 | 2133 | 914 | 914 | 914 | 914 |
| C-1 | 7.9 | 7.4 | 3.2 | 3.2 |  |  |
| C-2 |  |  |  |  | 4.7 |  |
| C-3 |  |  |  |  |  | 4.6 |
| D-1 | 0.06 | 0.06 | 0.06 | 0.06 | 0.06 | 0.06 |
| E-1 | 100 | 100 | 100 | 100 | 100 | 100 |
| F-1 | 0.4 | 0.4 | 0.4 | 0.4 | 0.4 | 0.4 |
| SiH/SiVi (number ratio) | 1.0 | 1.0 | 0.4 | 0.4 | 0.4 | 0.4 |
| Storage elastic modulus G' (after 3,000 sec) | Not becoming grease form | Not becoming grease form | Not cured | Not cured | Not cured | Not cured |
| Storage elastic modulus G' (after 7,200 sec) |  |  |  |  |  |  |
| Time required for storage elastic modulus to exceed loss elastic modulus (sec) |  |  |  |  |  |  |
| Viscosity (Pa · s) |  |  |  |  |  |  |
| Heat conductivity (W/m · °C.) |  |  |  |  |  |  |
| Thickness of silicone composition after crushability test (μm) |  |  |  |  |  |  |
| Result of spreadability test (area covered with silicone composition/area of silicon wafer) |  |  |  |  |  |  |

TABLE 4

|  | Comparative example 7 | Comparative example 8 | Comparative example 9 | Comparative example 10 | Comparative example 11 | Comparative example 12 | Comparative example 13 | Comparative example 14 |
|---|---|---|---|---|---|---|---|---|
| A-1 | 100 | 300 | 100 | 100 | 100 |  | 100 |  |
| A-2 |  |  |  |  |  | 100 |  | 100 |
| B-1 | 814 | 814 | 814 | 814 | 814 | 814 | 814 | 814 |
| B-2 | 100 | 100 | 100 | 100 | 100 | 100 | 100 | 100 |
| Total amount of filler | 914 | 914 | 914 | 914 | 914 | 914 | 914 | 914 |
| C-1 | 16.0 | 19.8 |  |  | 7.9 |  | 7.9 |  |
| C-2 |  |  | 23.4 | 29.3 |  | 7.4 |  | 7.4 |
| C-3 |  |  |  |  |  |  |  |  |
| D-1 | 0.06 | 0.06 | 0.06 | 0.06 | 0.06 | 0.06 | 0.06 | 0.06 |
| E-1 | 100 | 100 | 100 | 100 | 250 | 250 | 100 | 100 |
| F-1 | 0.4 | 0.4 | 0.4 | 0.4 | 0.4 | 0.4 | 1.5 | 1.5 |
| SiH/SiVi (number ratio | 2.0 | 2.5 | 2.0 | 2.5 | 1.0 | 1.0 | 1.0 | 1.0 |
| Storage elastic modulus G' (after 3,000 sec) | 217,930 | 336,180 | 149,030 | 261,350 | Not cured | Not cured | Not cured | Not cured |
| Storage elastic modulus G' (after 7,200 sec) | 305,810 | 477,060 | 232,690 | 347,550 |  |  |  |  |
| Time required for storage elastic modulus to exceed loss elastic modulus (sec) | 620 | 630 | 770 | 690 |  |  |  |  |
| Viscosity (Pa · s) | 8.6 | 8.0 | 7.7 | 7.4 |  |  |  |  |
| Heat conductivity (W/m · ° C.) | 1.9 | 1.9 | 1.8 | 1.7 |  |  |  |  |
| Thickness of silicone composition after crushability test (μm) | 94 | 96 | 90 | 91 |  |  |  |  |
| Result of spreadability test (area covered with silicone composition/area of silicon wafer) | 0.30 | 0.26 | 0.33 | 0.32 |  |  |  |  |

From the results of Tables 1 to 4, Examples 1 to 18 satisfying the requirements of the present invention showed smaller thicknesses of the silicone composition after the crushability test and larger resulting values of the spreadability test, compared with Comparative examples 1 to 14. Accordingly, it could be confirmed that the silicone composition of the present invention enables the heat-dissipating grease to be compressed into a prescribed thickness when the composition is used as the heat-dissipating grease to be placed between a heat-generating member and a cooling member, and also enables the applied heat-dissipating grease to sufficiently spread over the whole heat-generating part.

That is, in the method for manufacturing a heat-conductive silicone composition, a heat-conductive silicone composition excellent in crushability and spreadability can be surely obtained by selecting, from the produced silicone compositions, only compositions that can provide a cured product in which the storage elastic modulus G' after 3,000 seconds from the start of holding is 10,000 Pa or less, the storage elastic modulus G' after 7,200 seconds from the start of holding is 100,000 Pa or less, and the storage elastic modulus G' exceeds the loss elastic modulus G" after 800 seconds or more from the start of holding when the storage elastic modulus G' and the loss elastic modulus G" of the silicone composition is measured by the above-mentioned viscoelasticity measurement apparatus under the above heat increase conditions and high-temperature holding condition.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:
1. A silicone composition comprising:
(A) 100 parts by mass of an organopolysiloxane having at least two aliphatic unsaturated hydrocarbon groups per molecule, and having a kinematic viscosity at 25° C. of 60 to 100,000 mm$^2$/s;
(B) 100 to 2,000 parts by mass of a filler containing an aluminum powder and a zinc oxide powder;
(C) an organohydrogenpolysiloxane having two or more silicon-bonded hydrogen atoms (i.e. SiH group) per molecule, in such an amount that a ratio of a number of the SiH groups in the component (C) to a total number of the aliphatic unsaturated hydrocarbon groups in the component (A) ranges from 0.5 to 1.5;
(D) a platinum group metal catalyst in an amount of 0.1 to 500 ppm in terms of platinum with respect to the component (A);

(E) 1 to 200 parts by mass of a hydrolytic methylpolysiloxane represented by the general formula (1), based on 100 parts by mass of the component (A),

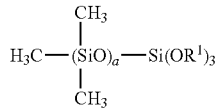
(1)

wherein $R^1$ represents an alkyl group having 1 to 6 carbon atoms and "a" is an integer of 5 to 100; and (F) 0.05 to 0.4 parts by mass of one or more retarders selected from the group consisting of acetylene compounds, nitrogen compounds, organophosphorous compounds, oxime compounds, and organochlorine compounds, based on 100 parts by mass of the component (A); wherein when a storage elastic modulus G' and a loss elastic modulus G" of the silicone composition is measured, by means of a viscoelasticity measurement apparatus capable of measuring shear modulus, while holding the silicone composition at 150° C. for 7,200 seconds after the silicone composition is heated from 25° C. to 125° C. at a temperature increase rate of 10° C./min, from 125° C. to 145° C. at a temperature increase rate of 2° C./rain, and from 145° C. to 150° C. at a temperature increase rate of 0.5° C./min, the silicone composition can provide a cured product in which the storage elastic modulus G' after 3,000 seconds from the start of holding is 10,000 Pa or less, the storage elastic modulus G' after 7,200 seconds from the start of holding is 100,000 Pa or less, and the storage elastic modulus G' exceeds the loss elastic modulus G' after 800 seconds or more from the start of holding.

2. The silicone composition according to claim 1, wherein the aluminum powder of component (B) includes an aluminum powder having an average particle size of 10 to 100 μm, and an aluminum powder having an average particle size of 0.1 μm to 5 μm.

3. A heat-dissipating grease obtained by curing the silicone composition according to claim 1.

4. A heat-dissipating grease obtained by curing the silicone composition according to claim 2.

* * * * *